US009728185B2

(12) United States Patent
Schalkwyk et al.

(10) Patent No.: US 9,728,185 B2
(45) Date of Patent: Aug. 8, 2017

(54) RECOGNIZING SPEECH USING NEURAL NETWORKS

(71) Applicant: Google Inc., Mountain View, CA (US)

(72) Inventors: Johan Schalkwyk, Scarsdale, NY (US); Francoise Beaufays, Mountain View, CA (US); Hasim Sak, New York, NY (US); John Giannandrea, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/720,113

(22) Filed: May 22, 2015

(65) Prior Publication Data

US 2015/0340034 A1 Nov. 26, 2015

Related U.S. Application Data

(60) Provisional application No. 62/001,962, filed on May 22, 2014.

(51) Int. Cl.
G10L 15/16 (2006.01)
G10L 15/18 (2013.01)
G10L 15/26 (2006.01)
G06N 3/02 (2006.01)
G10L 15/187 (2013.01)

(52) U.S. Cl.
CPC ............... *G10L 15/18* (2013.01); *G06N 3/02* (2013.01); *G10L 15/16* (2013.01); *G10L 15/187* (2013.01); *G10L 15/26* (2013.01)

(58) Field of Classification Search
USPC .............................. 704/260, 259, 256.1, 231
See application file for complete search history.

(56) References Cited

U.S. PATENT DOCUMENTS

| 9,263,036 B1* | 2/2016 | Graves ................... G10L 15/16 |
| 2002/0049591 A1* | 4/2002 | Hain ...................... G10L 13/08 704/243 |
| 2002/0116196 A1* | 8/2002 | Tran ...................... G06F 1/3203 704/270 |
| 2006/0195319 A1* | 8/2006 | Prous Blancafort .... G10L 15/18 704/235 |

OTHER PUBLICATIONS

Graves et al "Speech Recognition with Deep Recurrent Neural Networks" IEEE ICASSP 2013.*

(Continued)

*Primary Examiner* — Pierre-Louis Desir
*Assistant Examiner* — Yi-Sheng Wang
(74) *Attorney, Agent, or Firm* — Fish & Richardson P.C.

(57) ABSTRACT

Methods, systems, and apparatus, including computer programs encoded on computer storage media, for recognizing speech using neural networks. One of the methods includes receiving an audio input; processing the audio input using an acoustic model to generate a respective phoneme score for each of a plurality of phoneme labels; processing one or more of the phoneme scores using an inverse pronunciation model to generate a respective grapheme score for each of a plurality of grapheme labels; and processing one or more of the grapheme scores using a language model to generate a respective text label score for each of a plurality of text labels.

18 Claims, 4 Drawing Sheets

(56) References Cited

OTHER PUBLICATIONS

Decadt et al "Phoneme-to-Grapheme Conversion for Out-of-Vocabulary Words in Large Vocabulary Speech Recognition", IEEE Automatic Speech Recognition and Understanding Workshop 2001.*

Graves "Sequence Transduction with Recurrent Neural Networks", Proc. 29th International Conference on Machine Learning, Edinburgh, Scotland UK, 2012.*

Graves et al., "Connectionist Temporal Classification: Labelling Unsegmented Sequence Data with Recurrent Neural Networks," Proceedings of the $23^{rd}$ International Conference on Machine Learning, 2006.

Rao, "Grapheme-To-Phoneme Conversion Using Long Short-Term Memory Recurrent Neural Networks," $40^{th}$ IEEE International Conference on Acoustics, Speech and Signal Processing (ICASSP) 2015, Apr. 2015, Brisbane, Australia, 5 pages.

Sak et al., "Long Short-Term Memory Recurrent Neural Network Architectures for Large Scale Acoustic Modeling," INTERSPEECH 2014, Sep. 2014, pp. 338-342.

Sundermeyer et al., "LSTM Neural Networks for Language Modeling," 13th Annual Conference of the International Speech Communication Association, INTERSPEECH 2012, Sep. 2012, pp. 194-197.

\* cited by examiner

RECOGNIZING SPEECH USING NEURAL NETWORKS

CROSS-REFERENCE TO RELATED APPLICATION

This application claims priority to U.S. Provisional Application No. 62/001,962, filed on May 22, 2014. The disclosure of the prior application is considered part of and is incorporated by reference in the disclosure of this application.

BACKGROUND

This specification relates to speech recognition systems.

Speech recognition converts a spoken word to text. In some cases, speech (words spoken by a person) can be an efficient way to provide input to a software application program. Examples of systems that utilize speech recognition to improve efficiency can include transcription systems. In some cases, speech can be the input to software applications that control systems or devices when the use of other input methods by a user of the system is constrained by physical limitations. For example, the user may be unable to utilize their hands and/or eyes to provide system input as they are occupied with more important tasks. The user of a mobile computing device may be driving a car while using voice commands to operate the mobile computing device (e.g., place a phone call).

SUMMARY

In general, one innovative aspect of the subject matter described in this specification can be embodied in methods that include the actions of receiving an audio input; processing the audio input using an acoustic model to generate a respective phoneme score for each of a plurality of phoneme label sequences; processing one or more of the phoneme scores using an inverse pronunciation model to generate a respective grapheme score for each of a plurality of grapheme label sequences; and processing one or more of the grapheme scores using a language model to generate a respective text label score for each of a plurality of text label sequence, wherein each text label score reflects a likelihood that the audio input is represented by the corresponding text label sequence. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. By using a speech recognition system that is entirely neural network-based, the performance of the speech recognition system on previously unseen audio data can be improved. Different components of the neural network-based speech recognition system can be trained separately on different sources of training data, allowing the speech recognition system to train on a larger set of data and resulting in more accurate speech recognition. For example, a language model and an inverse pronunciation model can be trained on text training data while an acoustic model can be trained on audio training data. By training the language model and the inverse pronunciation model on text training data, limitations of the performance of the system due to a lack of audio training data can be avoided. Additionally, once individual components have been trained on different data sources, the entire speech recognition system can be trained on audio training data to jointly optimize the parameters of the components, resulting in more accurate speech recognition.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
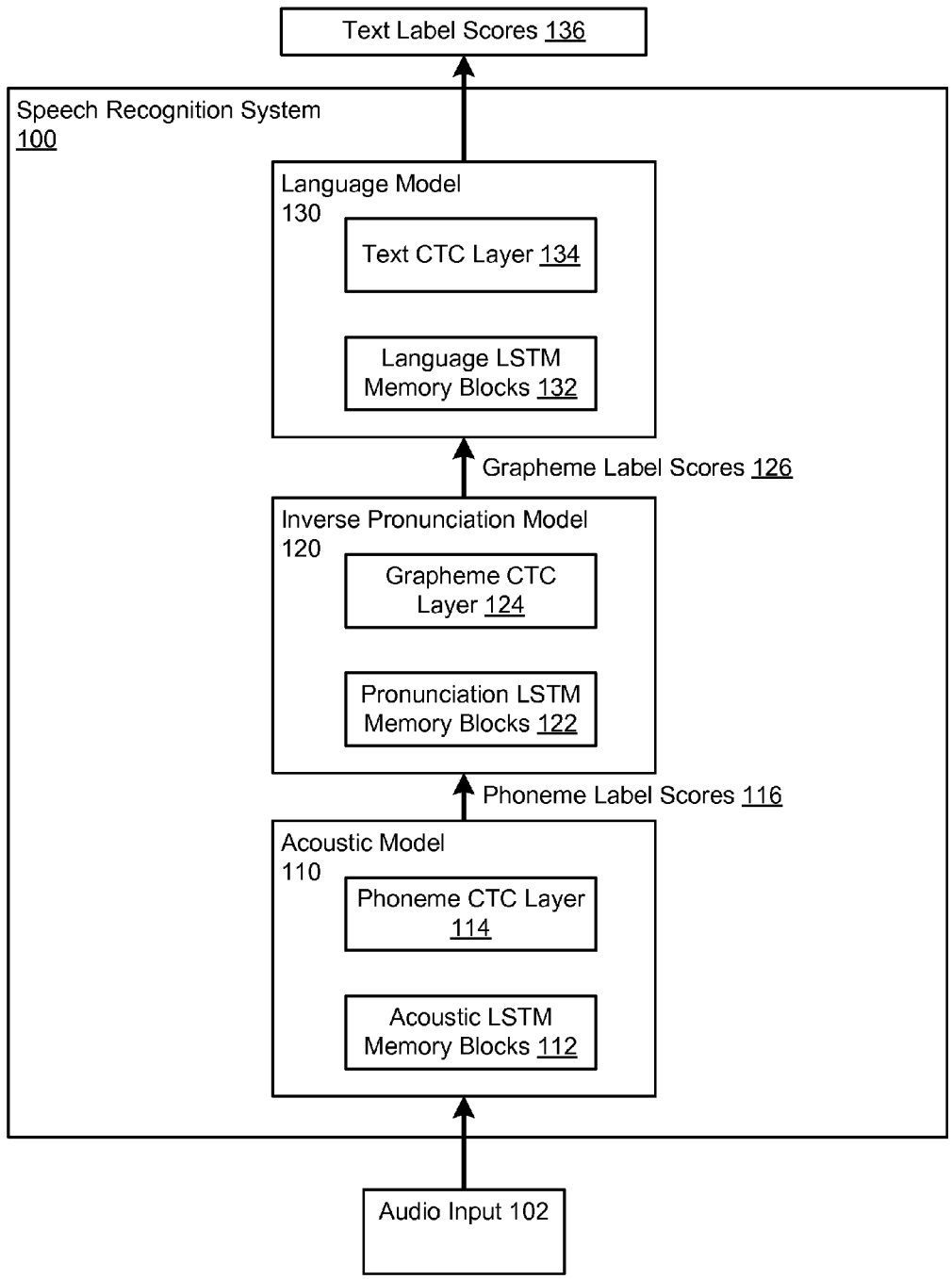
FIG. 1 shows an example speech recognition system.

FIG. 1 is a block diagram of an example speech recognition system 100. The speech recognition system 100 is an example of a system implemented as computer programs on one or more computers in one or more locations, in which the systems, components, and techniques described below can be implemented.

The speech recognition system 100 receives an input and generates a predicted output based on the received input. In particular, the input is an audio input, e.g., a recording of a speech input spoken by a user, and the predicted output is a predicted text transcript for the speech input. That is, the audio input can be an utterance during which a speaker has spoken a sequence of words, and the predicted output is a predicted text transcript for the sequence of words spoken in the audio input.

For example, the speech recognition system 100 can receive an audio input 102 and generate a set of text label scores 136 for the audio input 102. The text label scores 136 include a respective score for each of a set of possible text labels for the received audio input 102. The score for a given text label reflect a likelihood that the text label is the accurate text transcript of the audio input 102. Once the text label scores 136 have been generated, the speech recognition system 100 can select the text label having the highest score as the predicted text transcript for the audio input 102.

The speech recognition system 100 includes an acoustic model 110, an inverse pronunciation model 120, and a language model 130. In order to generate a predicted output for a received audio input, the speech recognition system 100 processes the received audio input through the acoustic model 110, the inverse pronunciation model 120, and the language model 130 in sequence to generate the set of text label scores for the received audio input.

The acoustic model 110 is a neural network-based model that that receives an audio input and generates a respective score for each of a set of phoneme label sequences, e.g., phoneme label scores 116 for the audio input 102. The phoneme labels in the sequences can include single phonemes, sequences of phonemes, e.g., biphones or triphones, or both. The phone labels can also include sequences of other phonetic units, e.g., di-phones, syllables, triphone-states, monophone-states, and so on. The score for a given phoneme label reflects the likelihood that the phoneme label represents the audio input. Optionally, the phoneme labels can include a "blank" phoneme label, with the score for the "blank" label reflecting the likelihood that none of the other phoneme labels are an accurate representation of the audio input.

In particular, the acoustic model 110 includes one or more acoustic long short term (LSTM) memory blocks 112 and a phoneme connectionist temporal classification (CTC) layer 114. The acoustic LSTM memory blocks 112 receive an audio input and process the audio input to generate an acoustic LSTM output in accordance with current values of a set of acoustic LSTM memory block parameters. Examples of acoustic LSTM memory blocks are described in more detail in "Connectionist Temporal Classification: Labelling Unsegmented Sequence Data with Recurrent Neural Networks," Alex Graves, Santiago Fernandez, Faustino Gomez, and Jurgen Schmidhuber, *Proceedings of the $23^{rd}$ International Conference on Machine Learning*, 2006.

The phoneme CTC layer 114 receives the acoustic LSTM output generated by the LSTM memory blocks 112 and generates a set of phoneme label scores in accordance with current values of a set of phoneme CTC parameters. For example, the phoneme CTC layer 114 may be a softmax classifier layer that generates scores for each of the phoneme labels, with the scores being probabilities that the corresponding phoneme label represents the audio input and, if the phoneme labels include a "blank" label, the score for the "blank" label being a probability that none of the other phoneme labels accurately represent the audio input. An example CTC layer is described in more detail in "Connectionist Temporal Classification: Labelling Unsegmented Sequence Data with Recurrent Neural Networks," Alex Graves, Santiago Fernandez, Faustino Gomez, and Jurgen Schmidhuber, *Proceedings of the $23^{rd}$ International Conference on Machine Learning*, 2006.

The inverse pronunciation model 120 is a neural network-based model that receives a set of phoneme label scores generated by the acoustic model 110 and generates a respective score for each of a set of grapheme label sequences, e.g., grapheme label scores 126 generated from the phoneme label scores 116. The grapheme labels in the sequences can include single graphemes, sequences of graphemes, or both. The score for a given grapheme reflects a likelihood that the audio input used to generate the phoneme label scores received as input by the inverse pronunciation model 120 is represented by the corresponding grapheme label. Optionally, the grapheme labels can include a "blank" grapheme label, with the score for the "blank" label reflecting the likelihood that none of the other grapheme labels are an accurate representation of the audio input.

In particular, the inverse pronunciation model 120 includes one or more pronunciation LSTM memory blocks 122 and one or more grapheme CTC layers 124. The pronunciation LSTM memory blocks 122 receive the phoneme label scores generated by the phoneme CTC layer 114 and process the received scores to generate a grapheme LSTM output in accordance with current values of a set of pronunciation LSTM memory block parameters.

The grapheme CTC layer 124 receives the grapheme LSTM output generated by the pronunciation memory blocks 122 and generates a set of grapheme label scores in accordance with current values of a set of grapheme CTC layer parameters. For example, the grapheme CTC layer 114 may be a softmax classifier layer that generates scores for each of the grapheme labels, with the scores being probabilities that the corresponding grapheme label represents the audio input and, if the grapheme labels include a "blank" label, the score for the "blank" label being a probability that none of the other grapheme labels accurately represent the audio input.

The language model 130 is a neural network-based model that receives a set of grapheme label scores generated by the inverse pronunciation model 120 and generates a respective score for each of a set of text labels, e.g., the text label scores 136 generated form the grapheme label scores 126. Each of the text labels is a possible transcript for the audio input, e.g., a sequence of one or more words. The text labels in the sequence can include words, sequences of words, e.g., phrases or sentences, or both. As described above, the score for a given text label reflects the likelihood that the text label is a text representation of the audio input used to generate the corresponding phoneme scores and grapheme scores. Optionally, the text labels can include a "blank" text label, with the score for the "blank" label reflecting the likelihood that none of the other text labels are an accurate representation of the audio input.

In particular, the language model 130 includes one or more language LSTM memory blocks 132 and a text CTC layer 134. The language LSTM memory blocks 132 receive the grapheme scores generated by the grapheme CTC layers 124 and process the received scores to generate a text LSTM output in accordance with current values of a set of language LSTM memory block parameters.

The text CTC layer 134 receives the text LSTM output generated by the language LSTM memory blocks 132 and generates a set of text label scores in accordance with current values of a set of text CTC layer parameters. For example, the text CTC layer 114 may be a softmax classifier layer that generates scores for each of the text labels, with the scores being probabilities that the corresponding text label represents the audio input and, if the text labels include a "blank" label, the score for the "blank" label being a probability that none of the other text labels represent the audio input.

Figure 2:
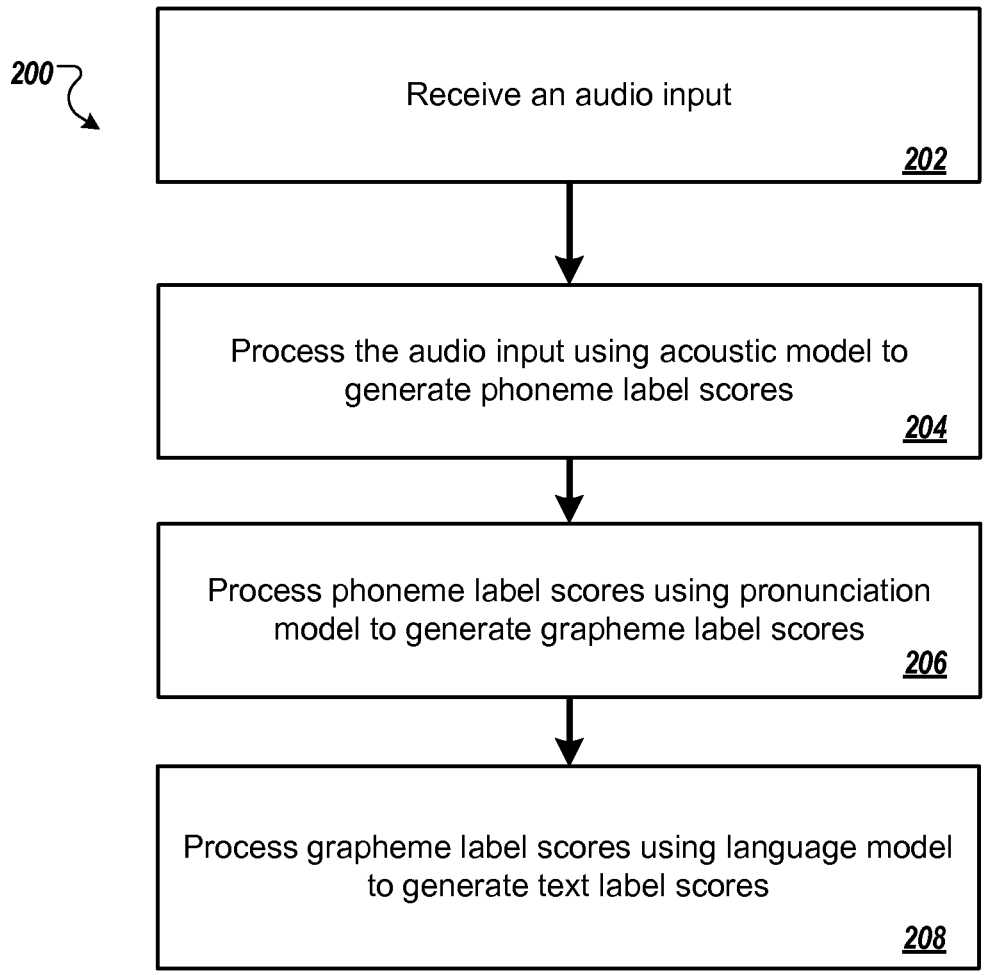
FIG. 2 is a flow diagram of an example process for processing audio input.

FIG. 2 is a flow diagram of an example process 200 for processing a received audio input. For convenience, the process 200 will be described as being performed by a system of one or more computers located in one or more locations. For example, a speech recognition system, e.g., the speech recognition system 100 of FIG. 1, appropriately programmed, can perform the process 200.

The system receives an audio input (step 202). In some implementations, the received audio input has been pre-processed, e.g., by computing frequency features for the audio input.

The system processes the audio input using an acoustic model to generate phoneme label scores for the audio input (step 204). That is, the system processes the audio input through one or more acoustic LSTM memory blocks, e.g., the acoustic LSTM memory blocks 112 of FIG. 1, and a phoneme CTC layer, e.g., the phoneme CTC layer 114 of FIG. 1, to generate the phoneme label scores for the audio input.

The system processes the phoneme label scores using an inverse pronunciation model to generate grapheme label scores for the audio input from the phoneme label scores (step 206). That is, the system processes the phoneme label scores through one or more pronunciation LSTM memory blocks, e.g., the pronunciation LSTM memory blocks 122 of FIG. 1, and a grapheme CTC layer, e.g., the grapheme CTC layer 114 of FIG. 1, to generate the grapheme label scores for the audio input.

The system processes the grapheme label scores using a language model to generate text label scores for the audio input from the grapheme label scores (step 208). That is, the system processes the grapheme label scores through one or more language LSTM memory blocks, e.g., the language LSTM memory blocks 132 of FIG. 1, and a text CTC layer, e.g., the text CTC layer 134 of FIG. 1, to generate the text label scores for the audio input. In some implementations, the system selects the highest scoring text label sequence as the correct transcript for the audio input.

The process 200 can be performed to predict text label scores for an input for which the desired output is not known, i.e., for a received audio input for which the desired text representation is not known, and after trained values of the parameters of the components of the acoustic model, the inverse pronunciation model, and the language model have already been determined.

However, the process 200 can also be performed on inputs in a set of training data, i.e., a set of inputs for which the output that should be predicted by the system is known, in order to train the system, i.e., to determine trained values for the parameters of the acoustic model, the inverse pronunciation model, and the language model. For example, the process 200 can be performed repeatedly on inputs selected from a set of training data as part of a backpropagation training technique that determines optimal values for each of the parameters of the acoustic model, the inverse pronunciation model, and the language model. Generally, the inputs in the set of training data are audio inputs that have an associated text label, i.e., that have already been classified as being represented by a text label in the set of text labels.

As part of the training process, if the label predicted by the language model for a particular audio input in the set of training data is different from the known desired label for that particular audio input, i.e., the text label scores generated by the inverse pronunciation model do not align with the label associated with the particular audio input, the language model will adjust the parameters of its internal components so as to reduce the expected error on that particular audio input using a conventional training technique. Furthermore, as part of the backpropagation method, the language model sends an error signal to the remaining components of the system, which allows the inverse pronunciation model and the acoustic model to adjust the parameters of their internal components through successive stages of backpropagation. An example backpropagation technique for training a neural network that includes a CTC layer is described in more detail in "Connectionist Temporal Classification: Labelling Unsegmented Sequence Data with Recurrent Neural Networks," Alex Graves, Santiago Fernandez, Faustino Gomez, and Jurgen Schmidhuber, *Proceedings of the 23rd International Conference on Machine Learning,* 2006.

However, in some cases, prior to being trained by performing multiple iterations of the process 200 as part of a training process for the system, the acoustic model, the inverse pronunciation model and the language model can be pre-trained separately. The values of the parameters of the components of the acoustic model, the inverse pronunciation model, and the language model after the pre-training can then be used as the initial parameter values for the corresponding components for the training process for the system. Additionally, as described below, each component can be pre-trained on training data from a different data source than one or more of the other components.

Figure 3:
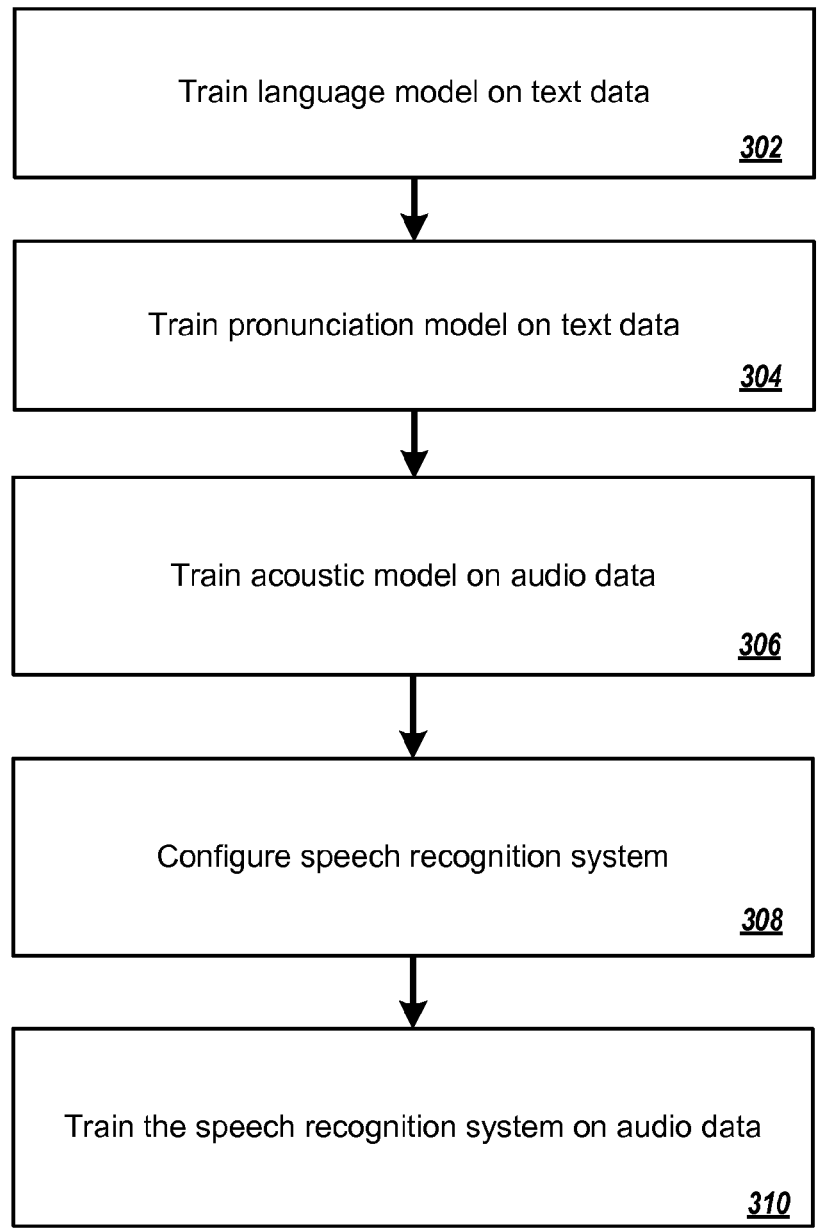
FIG. 3 is a flow diagram of an example process for training a speech recognition system.

FIG. 3 is a flow diagram of an example process 300 for training a speech recognition system. For convenience, the process 300 will be described as being performed by a system of one or more computers located in one or more locations. For example, a speech recognition system, e.g., the speech recognition system 100 of FIG. 1, appropriately programmed, can perform the process 300.

The system trains a language model, e.g., the language model 130 of FIG. 1, on text training data to obtain pre-trained values of the parameters of the language model (step 302). That is, the system sets initial values of the parameters of the components of the language model, i.e., one or more language LSTM memory blocks, e.g., the language LSTM memory blocks 132 of FIG. 1, and a text CTC layer, e.g., the text CTC layer 134 of FIG. 1. For example, the initial values may be randomly selected from a pre-determined range of parameter values. The system trains the language mode on the text training data to adjust the values of the parameters from the initial values to the pre-trained values. The system may utility any of a variety of training techniques to train the language model on the text training data. For example, the system can train the text CTC layer and the language LSTM memory blocks using a gradient descent with backpropagation in time training technique. The text training data includes sequences of graphemes for which the text label that should be generated by the language model is known and can include text data from any of a variety of sources. For example, the text training data can include search queries submitted to a search engine, text extracted from web pages, text extracted from a collection of documents, and so on.

The system trains an inverse pronunciation model on text training data to obtain pre-trained values of the parameters of the inverse pronunciation model (step 304). That is, the system sets initial values of the parameters of the components of the inverse pronunciation model, i.e., one or more pronunciation LSTM memory blocks, e.g., the pronunciation LSTM memory blocks 122 of FIG. 1, and a grapheme CTC layer, e.g., the grapheme CTC layer 124 of FIG. 1. The system trains the language mode on the text training data to adjust the values of the parameters from the initial values to the pre-trained values. As with the training of the language model, the system may utility any of a variety of training techniques to train the inverse pronunciation model on the text training data.

In some implementations, the text training data used to train the inverse pronunciation model may be the same as the text training data used to train the language model. However, in some other implementations, the language model and the inverse pronunciation model may be trained on different text training data.

The system trains an acoustic model on audio data to obtain pre-trained values of the parameters of the acoustic model (step 306). That is, the system sets initial values of the parameters of the components of the acoustic model, i.e., one or more acoustic LSTM memory blocks, e.g., the acoustic LSTM memory blocks 112 of FIG. 1, and a phoneme CTC layer, e.g., the phoneme CTC layer 114 of FIG. 1. For example, the initial values may be randomly selected from a pre-determined range of parameter values.

The system trains the acoustic model on the audio training data to adjust the values of the parameters from the initial values to the pre-trained values. Generally, the audio training data contains audio inputs that are each associated with a sequence of phonemes that represents the audio input, i.e., audio inputs for which the sequence of phonemes that should be predicted by the acoustic model is known. In some implementations, some of the audio inputs are associated with multiple sequences of phonemes, e.g., if a word in a spoken utterance has multiple possible pronunciations. As with the training of the inverse pronunciation model and the language model, the system may utilize any of a variety of training techniques to train the acoustic model on the audio training data.

The system configures a speech recognition system (step 308). That is, the system configures the acoustic model to provide the phoneme label scores generated by the acoustic model for received audio inputs as input to the inverse pronunciation model. Similarly, the system configures the inverse pronunciation model to provide the grapheme label scores generated by the inverse pronunciation model from received phoneme label scores as input to the language model.

The system trains the speech recognition system on audio training data (step 310) to obtain trained values of the parameters of the acoustic model, the inverse pronunciation model, and the language model from the corresponding pre-trained values. That is, the system trains the speech recognition system by performing the technique 200 for each audio input in the set of audio training data to generate text label scores for the audio input and then, if the text label scores do not align with the known label for the audio input, adjusting the current values of the parameters of the acoustic model, the inverse pronunciation model, and the language model using a backpropagation method as described above.

In some implementations, the audio data used to train the speech recognition system contains the same audio inputs as the audio data used to train the acoustic model separately. In some other implementations, however, the audio data used train the speech recognition system and the audio data used to train the acoustic model separately contain different audio inputs.

The above description describes the acoustic model, the inverse pronunciation model, and the language model as each including one or more LSTM memory blocks followed by a CTC layer. However, one or more of the acoustic model, the inverse pronunciation model, or the language may include a different kind of adaptive system that includes a memory mechanism in place of the LSTM memory blocks. For example, the adaptive system may be a different kind of recurrent neural network (RNN) or other kind of neural network based system that includes a memory mechanism. As another example, the adaptive system may be a non-neural network based adaptive system that includes a memory mechanism.

Figure 4:
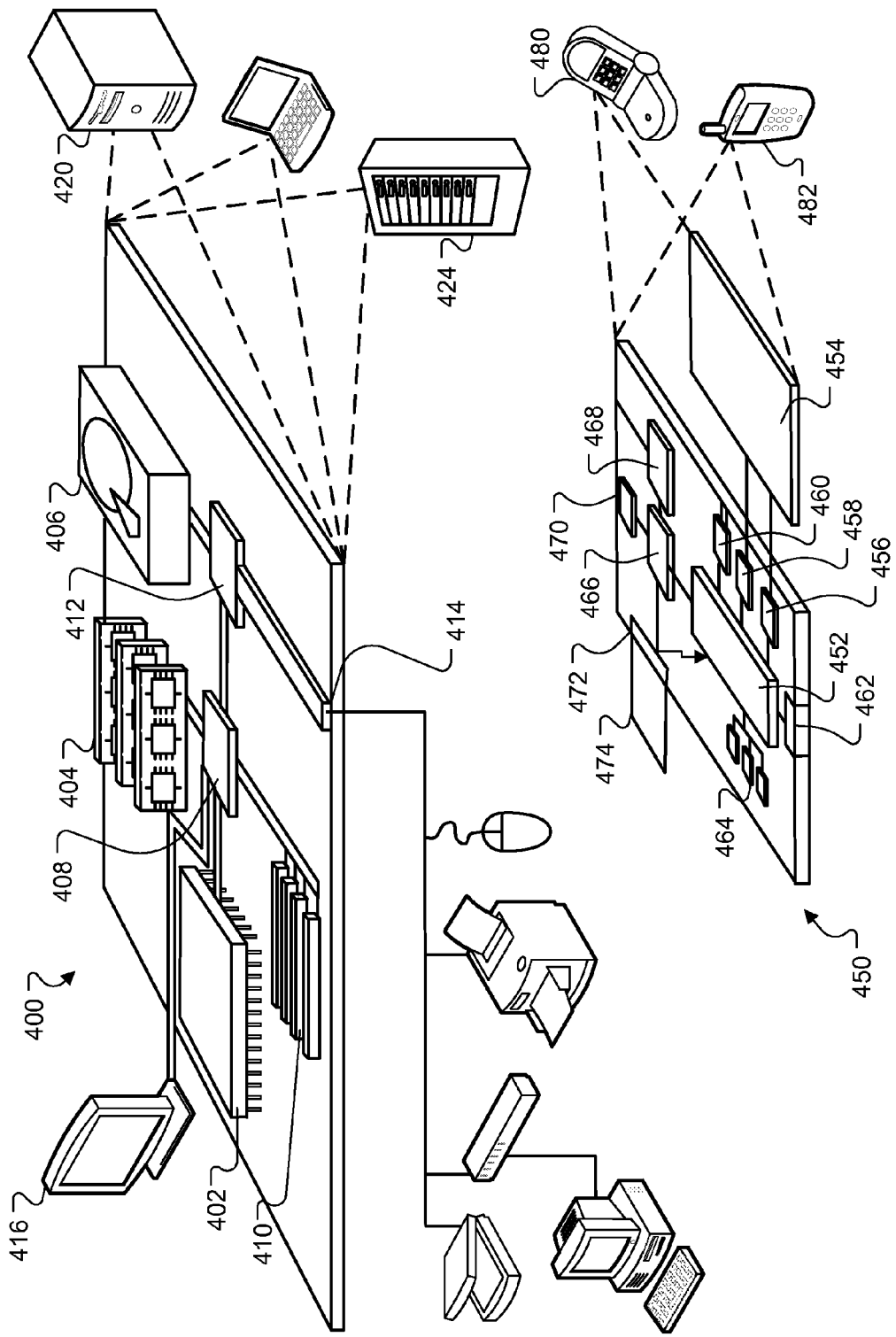
FIG. 4 is diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   pre-training, by a speech recognition system that includes a language model, the language model on a first set of text training data to obtain first trained parameter values for the language model;
   pre-training, by the speech recognition system that includes an inverse pronunciation model, the inverse pronunciation model on a second set of text training data that is a different set of text training data than the first set of text training data to obtain first trained parameter values for the inverse pronunciation model, the inverse pronunciation model being a different model than the language model;
   pre-training, by the speech recognition system that includes an acoustic model, the acoustic model on a first set of audio data to obtain first trained parameter values for the acoustic model, the acoustic model being a different model than the language model and a different model than the inverse pronunciation model;
   receiving, by the speech recognition system, a second set of audio data that a) comprises a plurality of audio inputs and b) is a different set of audio data than the first set of audio data;
   training, by the speech recognition system and subsequent to the pre-training, the acoustic model, the inverse pronunciation model, and the language model on the second set of audio data to obtain:
      second trained parameter values for the acoustic model using the first trained parameter values for the acoustic model,
      second trained parameter values for the inverse pronunciation model using the first trained parameter values for the inverse pronunciation model, and
      second trained parameter values for the language model using the first trained parameter values for the language model, the training comprising, for each audio input from the second set of audio data:
         processing, by the speech recognition system, the respective audio input from the second set of audio data using the first trained parameter values for the acoustic model to generate a respective phoneme score for each of a plurality of phoneme label sequences represented by data in the audio input, wherein the acoustic model comprises one or more long short term memory (LSTM) blocks that receive the audio input and generate an output from the audio input and one or more connectionist temporal classification (CTC) layers that receive the output from the LSTM blocks and transform the output into the phoneme scores;
         processing, by the speech recognition system, one or more of the phoneme scores using the first trained parameter values for the inverse pronunciation model to generate a respective grapheme score for each of a plurality of grapheme label sequences;
         processing, by the speech recognition system, one or more of the grapheme scores using the first trained parameter values for the language model to generate a respective text label score for each of a plurality of text label sequences, wherein each text label score reflects a likelihood that the corresponding text label sequence is an accurate transcript of the audio input; and
      adjusting, by the speech recognition system and using the text label scores for the plurality of text label sequences for the audio input, at least some of the first trained parameter values for the acoustic model, the inverse pronunciation model, and the language model; and
   causing, by the speech recognition system, storage of the acoustic model that includes the respective second trained parameter values, the inverse pronunciation model that includes the respective second trained parameter values, and the language model that includes the respective second trained parameter values for use together during a speech recognition process.

2. The method of claim 1, wherein the inverse pronunciation model comprises one or more LSTM blocks that receive the phoneme scores and generate an output from the phoneme scores and one or more CTC layers that receive the output from the LSTM blocks and transform the output into the grapheme scores.

3. The method of claim 2, wherein the language model comprises one or more LSTM blocks that receive the grapheme scores and generate an output from the grapheme scores and one or more CTC layers that receive the output from the LSTM blocks and transform the output into the text label scores.

4. The method of claim 1, wherein the language model comprises one or more LSTM blocks that receive the grapheme scores and generate an output from the grapheme scores and one or more CTC layers that receive the output from the LSTM blocks and transform the output into the text label scores.

5. The method of claim 1, wherein adjusting, by the speech recognition system and using the text label scores for the plurality of text label sequences for the audio input, at least some of the first trained parameter values for the acoustic model, the inverse pronunciation model, and the language model comprises training the inverse pronunciation model and the acoustic model using a backpropagation technique.

6. The method of claim 5, wherein:
   the inverse pronunciation model comprises one or more LSTM blocks that receive the phoneme scores and generate an output from the phoneme scores and one or more CTC layers that receive the output from the LSTM blocks and transform the output into the grapheme scores; and
   the language model comprises one or more LSTM blocks that receive the grapheme scores and generate an output from the grapheme scores and one or more CTC layers that receive the output from the LSTM blocks and transform the output into the text label scores.

7. A speech recognition system comprising one or more computers and one or more storage devices storing instructions that when executed by the one or more computers cause the one or more computers to perform operations comprising:

pre-training, by the speech recognition system that includes a language model, the language model on a first set of text training data to obtain first trained parameter values for the language model;

pre-training, by the speech recognition system that includes an inverse pronunciation model, the inverse pronunciation model on a second set of text training data that is a different set of text training data than the first set of text training data to obtain first trained parameter values for the inverse pronunciation model, the inverse pronunciation model being a different model than the language model;

pre-training, by the speech recognition system that includes an acoustic model, the acoustic model on a first set of audio data to obtain first trained parameter values for the acoustic model, the acoustic model being a different model than the language model and a different model than the inverse pronunciation model;

receiving, by the speech recognition system, a second set of audio data that a) comprises a plurality of audio inputs and b) is a different set of audio data than the first set of audio data;

training, by the speech recognition system and subsequent to the pre-training, the acoustic model, the inverse pronunciation model, and the language model on the second set of audio data to obtain:

second trained parameter values for the acoustic model using the first trained parameter values for the acoustic model, second trained parameter values for the inverse pronunciation model using the first trained parameter values for the inverse pronunciation model, and second trained parameter values for the language model using the first trained parameter values for the language model, the training comprising, for each audio input from the second set of audio data:

processing, by the speech recognition system, the respective audio input from the second set of audio data using the first trained parameter values for the acoustic model to generate a respective phoneme score for each of a plurality of phoneme label sequences represented by data in the audio input, wherein the acoustic model comprises one or more long short term memory (LSTM) blocks that receive the audio input and generate an output from the audio input and one or more connectionist temporal classification (CTC) layers that receive the output from the LSTM blocks and transform the output into the phoneme scores;

processing, by the speech recognition system, one or more of the phoneme scores using the first trained parameter values for the inverse pronunciation model to generate a respective grapheme score for each of a plurality of grapheme label sequences;

processing, by the speech recognition system, one or more of the grapheme scores using the first trained parameter values for the language model to generate a respective text label score for each of a plurality of text label sequences, wherein each text label score reflects a likelihood that the corresponding text label sequence is an accurate transcript of the audio input; and adjusting, by the speech recognition system and using the text label scores for the plurality of text label sequences for the audio input, at least some of the first trained parameter values for the acoustic model, the inverse pronunciation model, and the language model; and causing, by the speech recognition system, storage of the acoustic model that includes the respective second trained parameter values, the inverse pronunciation model that includes the respective second trained parameter values, and the language model that includes the respective second trained parameter values for use together during a speech recognition process.

8. The system of claim 7, wherein the inverse pronunciation model comprises one or more LSTM blocks that receive the phoneme scores and generate an output from the phoneme scores and one or more CTC layers that receive the output from the LSTM blocks and transform the output into the grapheme scores.

9. The system of claim 8, wherein the language model comprises one or more LSTM blocks that receive the grapheme scores and generate an output from the grapheme scores and one or more CTC layers that receive the output from the LSTM blocks and transform the output into the text label scores.

10. The system of claim 7, wherein the language model comprises one or more LSTM blocks that receive the grapheme scores and generate an output from the grapheme scores and one or more CTC layers that receive the output from the LSTM blocks and transform the output into the text label scores.

11. The system of claim 7, wherein adjusting, by the speech recognition system and using the text label scores for the plurality of text label sequences for the audio input, at least some of the first trained parameter values for the acoustic model, the inverse pronunciation model, and the language model comprises training the inverse pronunciation model and the acoustic model using a backpropagation technique.

12. The system of claim 11, wherein:

the inverse pronunciation model comprises one or more LSTM blocks that receive the phoneme scores and generate an output from the phoneme scores and one or more CTC layers that receive the output from the LSTM blocks and transform the output into the grapheme scores; and the language model comprises one or more LSTM blocks that receive the grapheme scores and generate an output from the grapheme scores and one or more CTC layers that receive the output from the LSTM blocks and transform the output into the text label scores.

13. A non-transitory computer storage medium encoded with instructions that, when executed by one or more computers included in a speech recognition system, cause the one or more computers to perform operations comprising:

pre-training, by the speech recognition system that includes a language model, the language model on a first set of text training data to obtain first trained parameter values for the language model;

pre-training, by the speech recognition system that includes an inverse pronunciation model, the inverse pronunciation model on a second set of text training data that is a different set of text training data than the first set of text training data to obtain first trained parameter values for the inverse pronunciation model, the inverse pronunciation model being a different model than the language model;

pre-training, by the speech recognition system that includes an acoustic model, the acoustic model on a first set of audio data to obtain first trained parameter values for the acoustic model, the acoustic model being a different model than the language model and a different model than the inverse pronunciation model;

receiving, by the speech recognition system, a second set of audio data that a) comprises a plurality of audio inputs and b) is a different set of audio data than the first set of audio data;

training, by the speech recognition system and subsequent to the pre-training, the acoustic model, the inverse pronunciation model, and the language model on the second set of audio data to obtain:

second trained parameter values for the acoustic model using the first trained parameter values for the acoustic model, second trained parameter values for the inverse pronunciation model using the first trained parameter values for the inverse pronunciation model, and second trained parameter values for the language model using the first trained parameter values for the language model, the training comprising, for each audio input from the second set of audio data:

processing, by the speech recognition system, the respective audio input from the second set of audio data using the first trained parameter values for the acoustic model to generate a respective phoneme score for each of a plurality of phoneme label sequences represented by data in the audio input, wherein the acoustic model comprises one or more long short term memory (LSTM) blocks that receive the audio input and generate an output from the audio input and one or more connectionist temporal classification (CTC) layers that receive the output from the LSTM blocks and transform the output into the phoneme scores;

processing, by the speech recognition system, one or more of the phoneme scores using the first trained parameter values for the inverse pronunciation model to generate a respective grapheme score for each of a plurality of grapheme label sequences;

processing, by the speech recognition system, one or more of the grapheme scores using the first trained parameter values for the language model to generate a respective text label score for each of a plurality of text label sequences, wherein each text label score reflects a likelihood that the corresponding text label sequence is an accurate transcript of the audio input; and adjusting, by the speech recognition system and using the text label scores for the plurality of text label sequences for the audio input, at least some of the first trained parameter values for the acoustic model, the inverse pronunciation model, and the language model; and causing, by the speech recognition system, storage of the acoustic model that includes the respective second trained parameter values, the inverse pronunciation model that includes the respective second trained parameter values, and the language model that includes the respective second trained parameter values for use together during a speech recognition process.

14. The computer storage medium of claim 13, wherein the inverse pronunciation model comprises one or more LSTM blocks that receive the phoneme scores and generate an output from the phoneme scores and one or more CTC layers that receive the output from the LSTM blocks and transform the output into the grapheme scores.

15. The computer storage medium of claim 14, wherein the language model comprises one or more LSTM blocks that receive the grapheme scores and generate an output from the grapheme scores and one or more CTC layers that receive the output from the LSTM blocks and transform the output into the text label scores.

16. The computer storage medium of claim 13, wherein the language model comprises one or more LSTM blocks that receive the grapheme scores and generate an output from the grapheme scores and one or more CTC layers that receive the output from the LSTM blocks and transform the output into the text label scores.

17. The computer storage medium of claim 13, wherein adjusting, by the speech recognition system and using the text label scores for the plurality of text label sequences for the audio input, at least some of the first trained parameter values for the acoustic model, the inverse pronunciation model, and the language model comprises training the inverse pronunciation model and the acoustic model using a backpropagation technique.

18. The computer storage medium of claim 17, wherein:
the inverse pronunciation model comprises one or more LSTM blocks that receive the phoneme scores and generate an output from the phoneme scores and one or more CTC layers that receive the output from the LSTM blocks and transform the output into the grapheme scores; and
the language model comprises one or more LSTM blocks that receive the grapheme scores and generate an output from the grapheme scores and one or more CTC layers that receive the output from the LSTM blocks and transform the output into the text label scores.

* * * * *